US007738241B2

(12) United States Patent
Hsieh et al.

(10) Patent No.: US 7,738,241 B2

(45) Date of Patent: Jun. 15, 2010

(54) AUXILIARY MOUNTING DEVICE CAPABLE OF GUIDING AN AUDIO OUTPUT FROM AN ELECTRONIC DEVICE

(75) Inventors: Yi-Che Hsieh, San-Chung (TW); Shih-Feng Lo, Yung-Ho (TW); Chi-Chao Fang, Changhua Hsien (TW); Jui-Chun Shyur, Taipei (TW)

(73) Assignee: Micro-Star International Co., Ltd., Taipei Hsien (TW)

( * ) Notice: Subject to any disclaimer, the term of this patent is extended or adjusted under 35 U.S.C. 154(b) by 399 days.

(21) Appl. No.: 11/949,270

(22) Filed: Dec. 3, 2007

(65) Prior Publication Data

US 2009/0057053 A1 Mar. 5, 2009

(30) Foreign Application Priority Data

Sep. 4, 2007 (TW) .............................. 96214775 U

(51) Int. Cl.
*G06F 1/16* (2006.01)

(52) U.S. Cl. ................ 361/679.1; 381/334; 297/180.1; 455/569.1; 361/709

(58) Field of Classification Search ................ 381/334; 353/15; 361/690, 709, 679.06, 679.27, 679.57, 361/679.21; 297/140, 217.3, 180.1; 248/309.1, 248/419, 309.3, 205.8, 669; 455/556.1, 569.1
See application file for complete search history.

(56) References Cited

U.S. PATENT DOCUMENTS

| | | | | |
|---|---|---|---|---|
| 2005/0088620 | A1 * | 4/2005 | Dwyer et al. | 353/15 |
| 2005/0265569 | A1 * | 12/2005 | Langberg et al. | 381/334 |
| 2006/0232921 | A1 * | 10/2006 | Brandenberg et al. | 361/683 |
| 2007/0247794 | A1 * | 10/2007 | Jaffe et al. | 361/681 |

* cited by examiner

*Primary Examiner*—Hung V Duong
(74) *Attorney, Agent, or Firm*—Stephen A. Bent; Foley & Lardner LLP

(57) ABSTRACT

An auxiliary mounting device includes a mounting seat mounted with an electronic device thereon and having an upright rear wall formed with a through hole that is aligned with a rear opening unit in a housing of the electronic device. An upright reflecting plate is connected to a rear surface of the rear wall, is disposed adjacent to the through hole, is pivotable about a vertical axis relative to the rear wall, and is operated at a used position, where a desired angle is formed between the reflecting plate and the rear surface of the rear wall such that sound waves of an audio output reproduced by a loudspeaker of the electronic device propagate rearwardly from the electronic device through the through hole in the mounting seat and are then reflected by the reflecting plate so as to propagate sidewardly and frontwardly.

9 Claims, 8 Drawing Sheets

AUXILIARY MOUNTING DEVICE CAPABLE OF GUIDING AN AUDIO OUTPUT FROM AN ELECTRONIC DEVICE

CROSS-REFERENCE TO RELATED APPLICATION

This application claims priority of Taiwanese Application No. 096214775, filed on Sep. 4, 2007.

BACKGROUND OF THE INVENTION

1. Field of the Invention

The invention relates to an auxiliary mounting device for an electronic device, more particularly to an auxiliary mounting device capable of guiding an audio output from an electronic device.

2. Description of the Related Art

FIG. 1 illustrates a conventional portable electronic device 1, such as a mobile phone, a personal digital assistant, a GPS (global positioning system) device or a digital player, that includes a housing 11 provided with a pair of loudspeakers 12 therein for reproducing an audio output. The housing 11 has a rear wall 111 formed with two hole units corresponding respectively to the loudspeakers 12 and including a plurality of apertures 112. The audio output reproduced by the loudspeakers 12 is in the form of sound waves that propagate outwardly through the apertures 112. In such a configuration, a poor sound effect is provided for a listener located in front of the electronic device 1.

SUMMARY OF THE INVENTION

Therefore, the object of the present invention is to provide an auxiliary mounting device for an electronic device that can overcome the aforesaid drawback of the prior art.

According to one aspect of the present invention, there is provided an auxiliary mounting device adapted for use with an electronic device. The electronic device includes a housing formed with a rear opening unit, and a loudspeaker disposed in the housing for reproducing an audio output in the form of sound waves that propagate rearwardly through the rear opening unit. The auxiliary mounting device comprises:

a mounting seat adapted to be mounted with the electronic device thereon and including an upright rear wall that has opposite front and rear surfaces, and a through hole extending from the front surface to the rear surface and adapted to be aligned with the rear opening unit in the housing of the electronic device when the electronic device is mounted on the mounting seat; and an upright reflecting plate connected to the rear surface of the rear wall, disposed adjacent to the through hole, and pivotable about a vertical axis relative to the rear wall of the mounting seat, the reflecting plate being operated at a used position, where a desired angle is formed between the reflecting plate and the rear surface of the rear wall such that the sound waves propagate rearwardly from the electronic device through the through hole in the rear wall of the mounting seat and are then reflected by the reflecting plate so as to propagate sidewardly and frontwardly.

According to another aspect of the present invention, an electronic device assembly comprises:

an electronic device including a housing formed with a rear opening unit, and a loudspeaker disposed in the housing for reproducing an audio output in the form of sound waves that propagate rearwardly through the rear opening unit; and an auxiliary mounting device including a mounting seat mounted with the electronic device thereon and including an upright rear wall that has opposite front and rear surfaces, and a through hole extending from the front surface to the rear surface and aligned with the rear opening unit in the housing of the electronic device, and an upright reflecting plate connected to the rear surface of the rear wall, disposed adjacent to the through hole, and pivotable about a vertical axis relative to the rear wall of the mounting seat, the reflecting plate being operated at a used position, where a desired angle is formed between the reflecting plate and the rear surface of the rear wall such that the sound waves propagate rearwardly from the electronic device through the through hole in the rear wall of the mounting seat and are then reflected by the reflecting plate so as to propagate sidewardly and frontwardly.

According to a further aspect of the present invention, there is provided an auxiliary mounting device adapted for use with an electronic device. The electronic device includes a housing formed with a rear opening unit, and a loudspeaker disposed in the housing for reproducing an audio output in the form of sound waves that propagate rearwardly through the rear opening unit. The auxiliary mounting device comprises:

a mounting seat adapted to be mounted with the electronic device thereon and including an upright rear wall that has opposite front and rear surfaces, and a through hole extending from the front surface to the rear surface and adapted to be aligned with the rear opening unit in the housing of the electronic device when the electronic device is mounted on the mounting seat.

The through hole in the rear wall of the mounting seat has a diameter increasing gradually from the front surface toward the rear surface such that the sound waves are collected through the through hole to propagate rearwardly.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
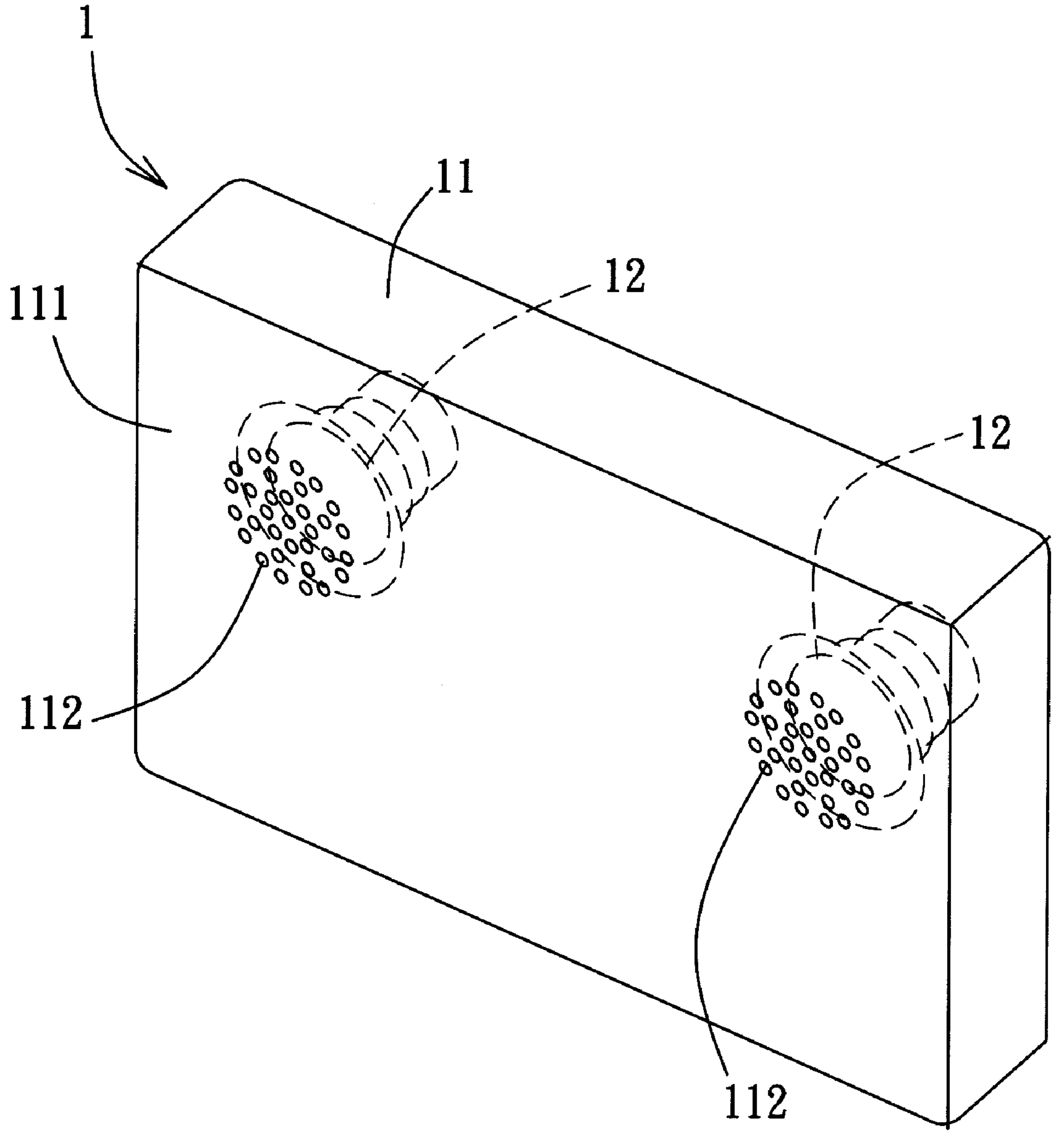
F I G. 1 PRIOR ART
FIG. 1 is a perspective view of a conventional electronic device.
Figure 2:
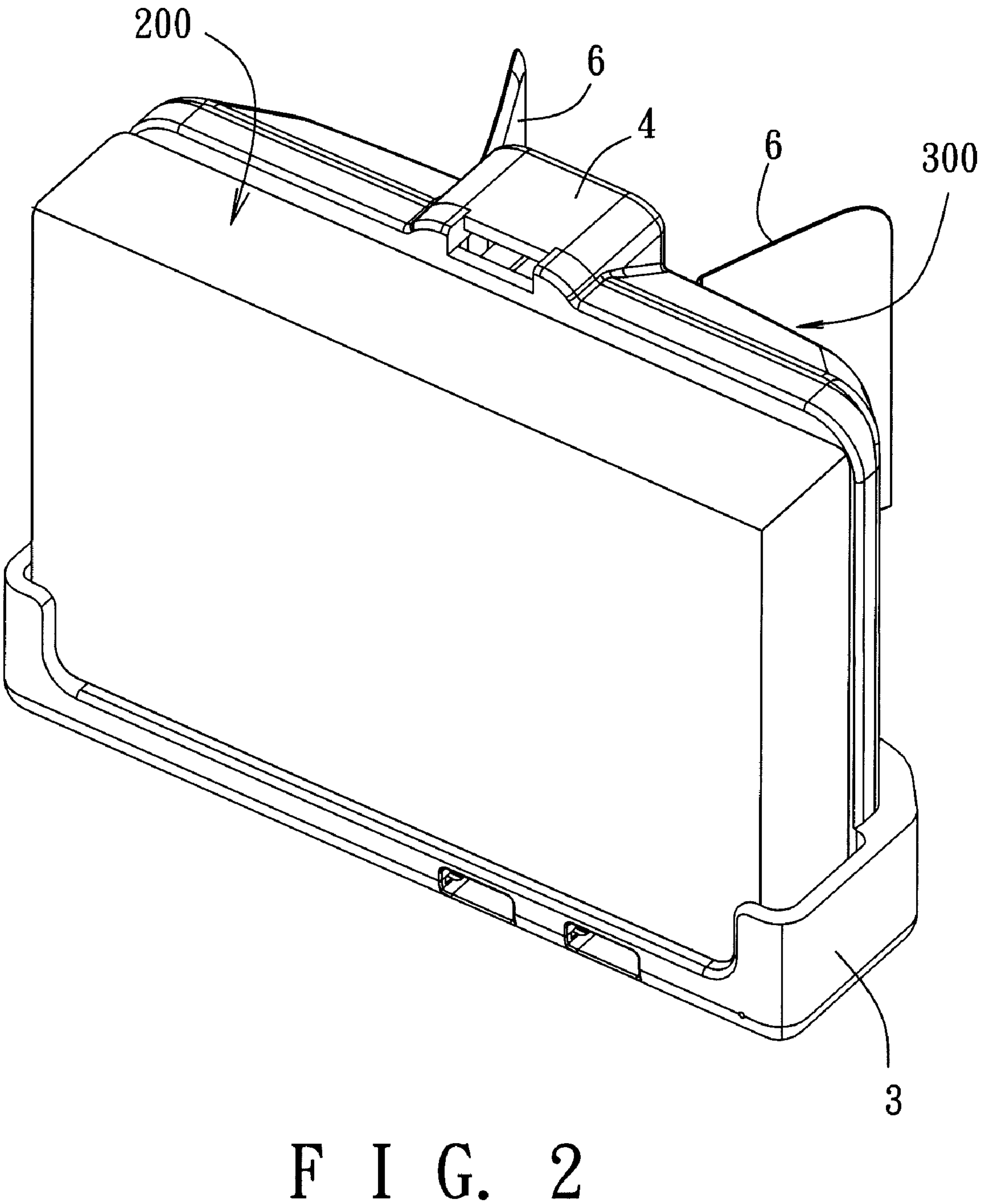
FIG. 2 is a perspective view showing the preferred embodiment of an electronic device assembly according to the present invention.
Figure 3:
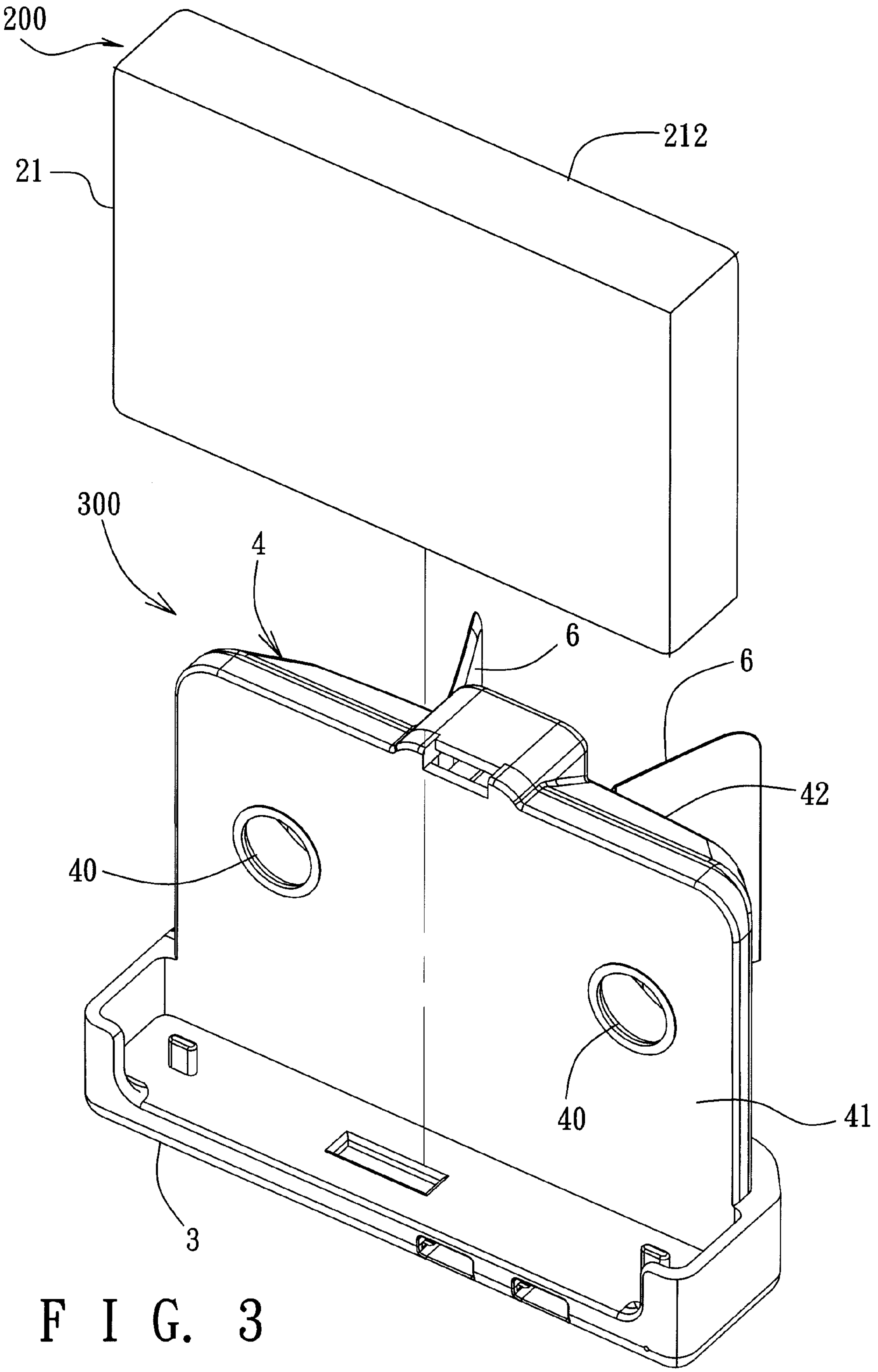
FIG. 3 is a partly exploded perspective view showing the preferred embodiment.
Figure 4:
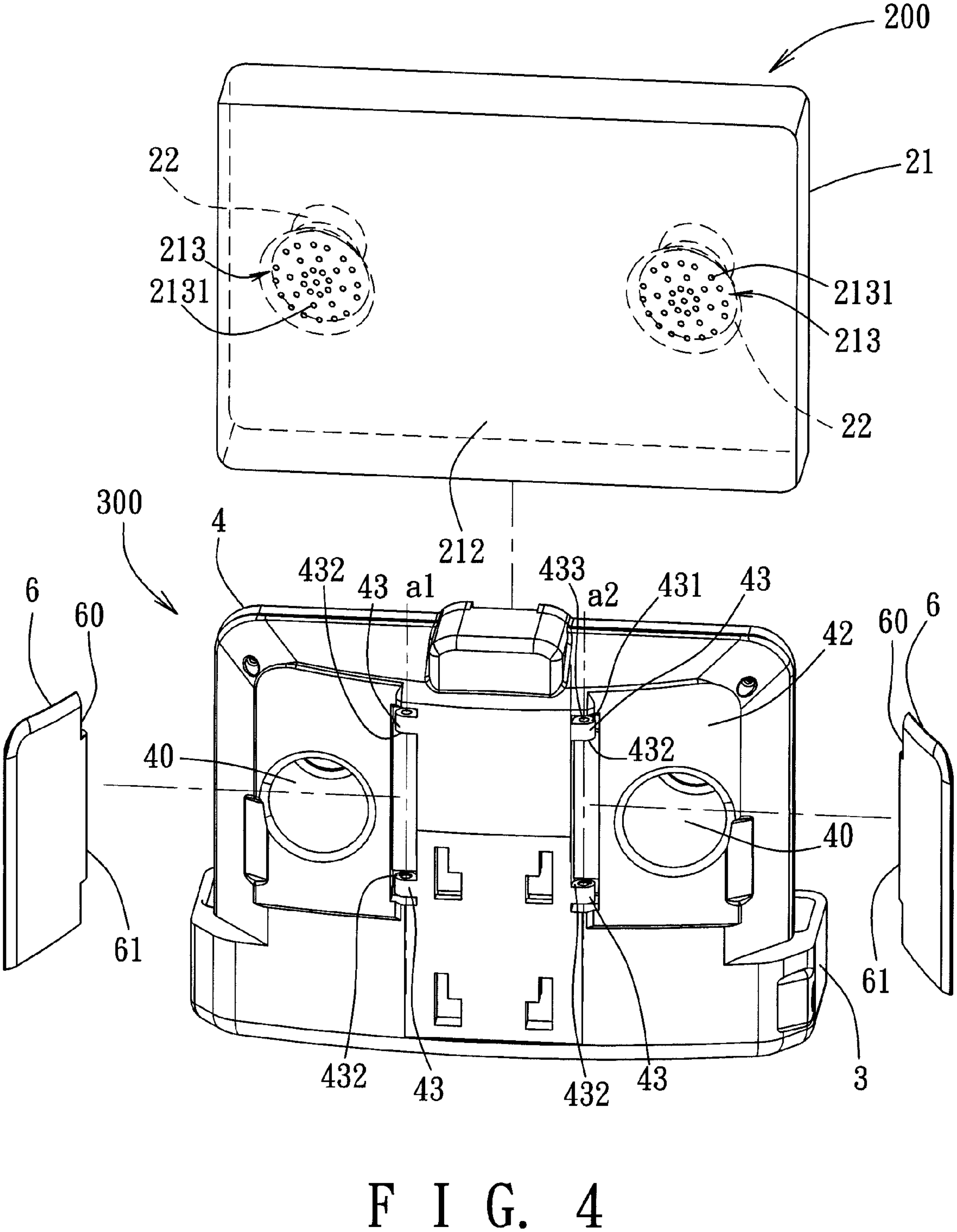
FIG. 4 is an exploded perspective rear view showing the preferred embodiment.

Referring to FIGS. 2 to 4, the preferred embodiment of an electronic device assembly according to the present invention is shown to include an electronic device 200 and an auxiliary mounting device 300.

The electronic device 200, such as a GPS (global positioning system) device, a mobile phone, a portable digital player or a personal digital assistant, includes a housing 21 and a pair of loudspeakers 22. The housing 21 has a rear side 212 formed with a pair of rear opening units 213 opposite to each other in a transverse direction. Each rear opening unit 213 includes a plurality of apertures 2131. The loudspeakers 22 are disposed in the housing 21 for reproducing an audio output having 0.5 W in the form of sound waves that propagate rearwardly through the rear opening units 213.

The auxiliary mounting device 300 includes a mounting seat 3 and a pair of upright reflecting plates 6. The auxiliary mounting device 300 may function as a charging seat.

Figure 7:
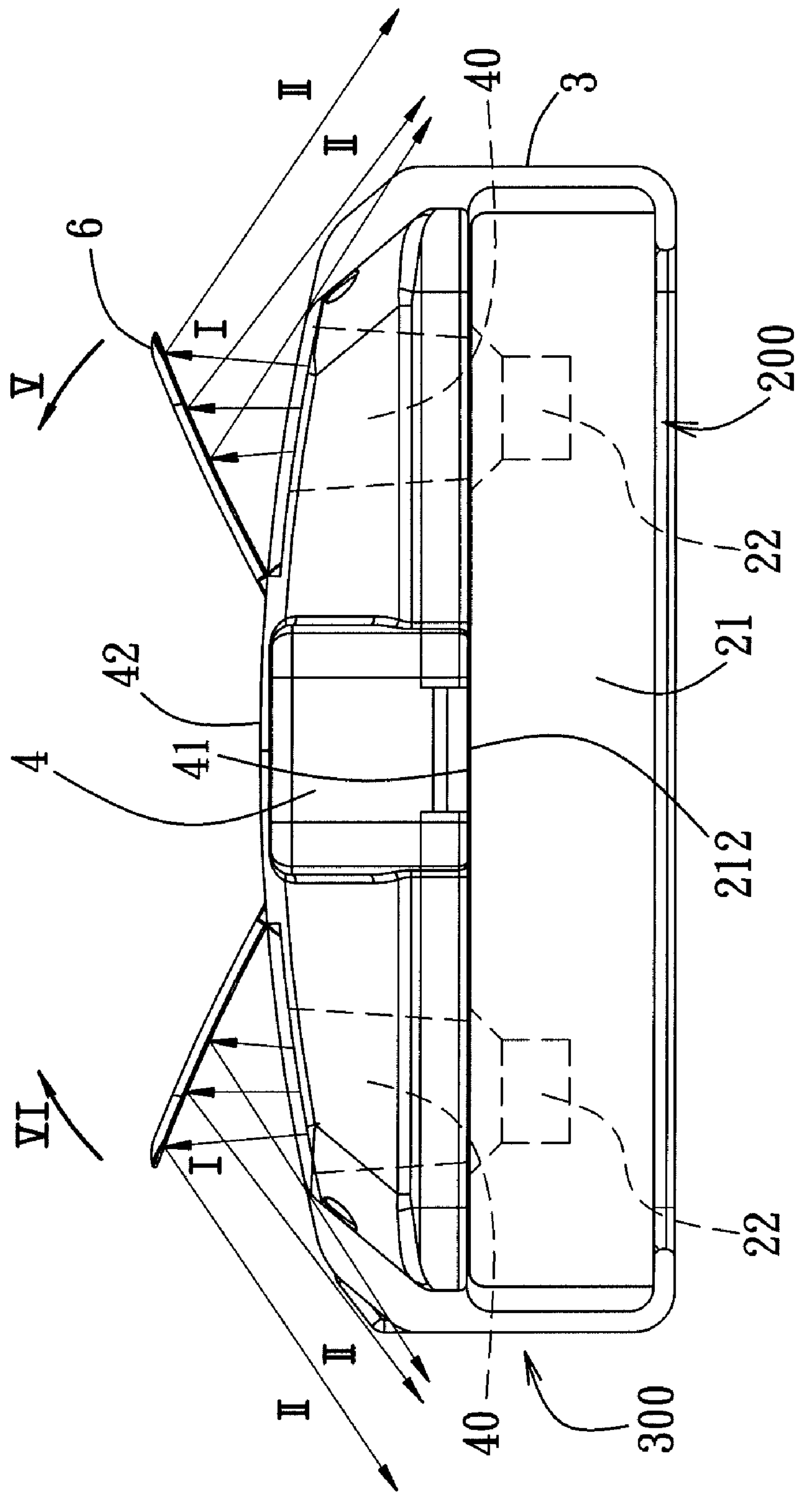
FIG. 7 is a schematic top view showing the preferred embodiment when in a state of use.

Referring further to FIG. 7, the mounting seat 3 is mounted with the electronic device 200 thereon, and includes an upright rear wall 4 that has opposite front and rear surfaces 41, 42, and a pair of through holes 40 extending from the front surface 41 to the rear surface 42 and aligned respectively with the rear opening units 213 in the housing 21 of the electronic device 200. In this embodiment, each through hole 40 in the rear wall 4 has a diameter increasing gradually from the front surface 41 toward the rear surface 42. The mounting seat 3 further has two pairs of pivot seats 43. The pivot seats 43 in each pair extend from the rear surface 42 of the rear wall 4, are disposed adjacent to a corresponding one of the through holes 40, and are arranged spacedly along a vertical axis (a1, a2). The pivot seats 43 in each pair have horizontal inner surfaces 432 that confront each other (see FIG. 4).

Figure 6:
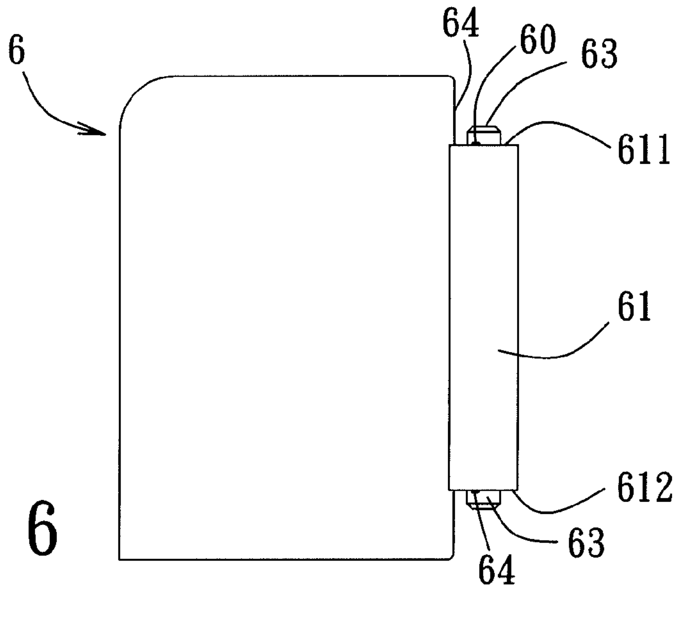
FIG. 6 is a schematic view showing a reflecting plate of the auxiliary mounting seat of the preferred embodiment.

Referring further to FIG. 6, the reflecting plates 6 are connected to the rear surface 42 of the rear wall 4, are disposed respectively adjacent to the through holes 40, and are pivotable respectively about the vertical axes (a1, a2) relative to the rear wall 4 of the mounting seat 3. In this embodiment, each reflecting plate 6 has a connecting side 60 formed with a pivot block 61 that is disposed fittingly between a corresponding pair of the pivot seats 43 and that has opposite top and bottom surfaces 611, 612 facing respectively the horizontal inner surfaces 432 of the corresponding pair of the pivot seats 43.

Figure 5:
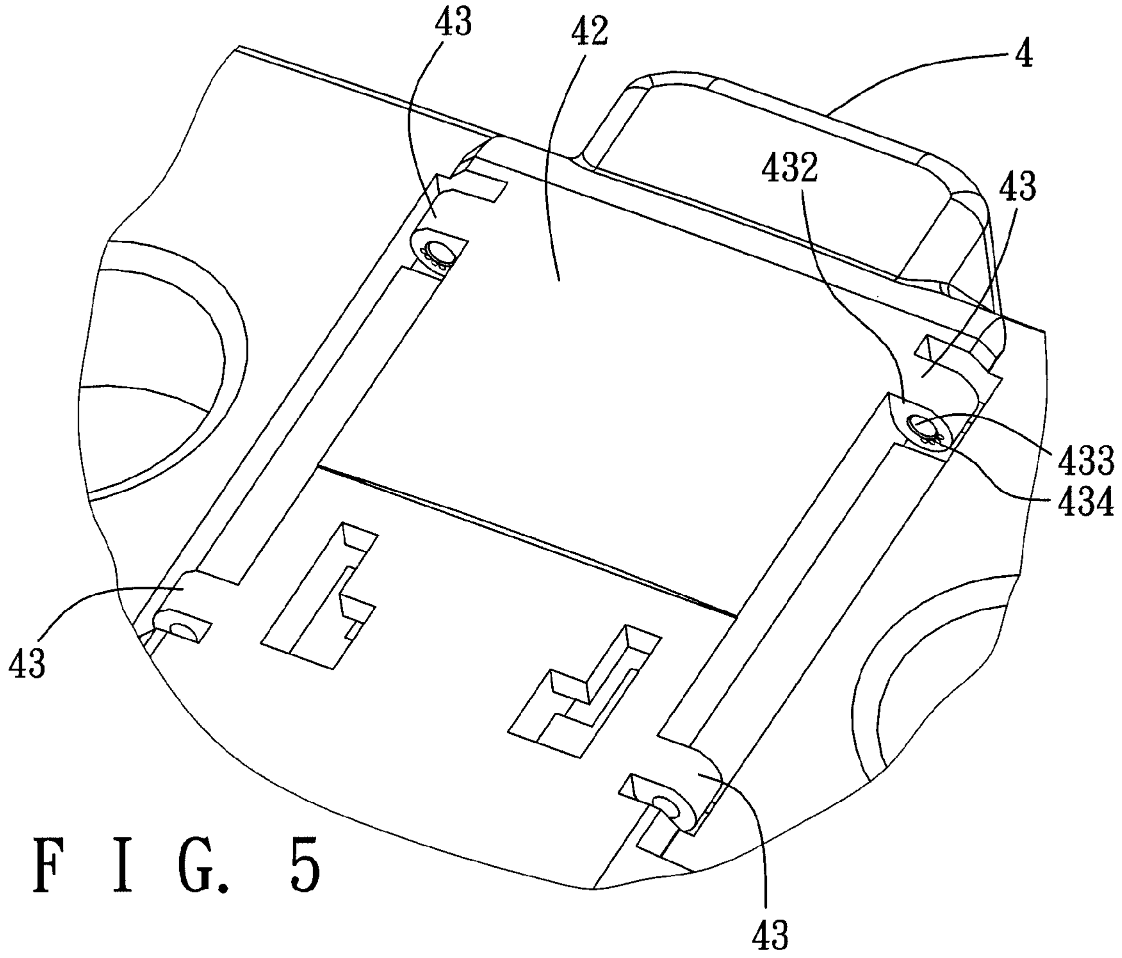
FIG. 5 is a fragmentary perspective view showing a rear wall of an auxiliary mounting seat of the preferred embodiment.

Referring further to FIG. 5, in this embodiment, the auxiliary mounting device 300 further two pivot units for connecting pivotally and respectively the reflecting plates 6 to the pairs of the pivot seats 43, and two positioning units for positioning each reflecting plate 6 at a used position.

Each pivot unit has two pivot holes 433 formed respectively in the horizontal inner surfaces 432 of a corresponding pair of the pivot seats 43, and two pivot rods 63 formed respectively on the top and bottom surfaces 611, 612 of a corresponding one of the reflecting plates 6 and engaging pivotally and respectively the pivot holes 433. As a result, the reflecting plates 6 are pivotable respectively about the vertical axes (a1, a2) relative to the rear wall 4 of the mounting seat 3, and are operated at the used position, where a desired angle is formed between each reflecting plate 6 and the rear surface 42 of the rear wall 4 such that the sound waves propagate rearwardly from the loudspeakers 22 of the electronic device 200 through the through holes 40 in the rear wall 4 of the mounting seat 3, as indicated by arrows (I) of FIG. 7, and are then reflected by the reflecting plates 6 so as to propagate sidewardly and frontwardly, as indicated by arrows (II) of FIG. 7.

Figure 8:
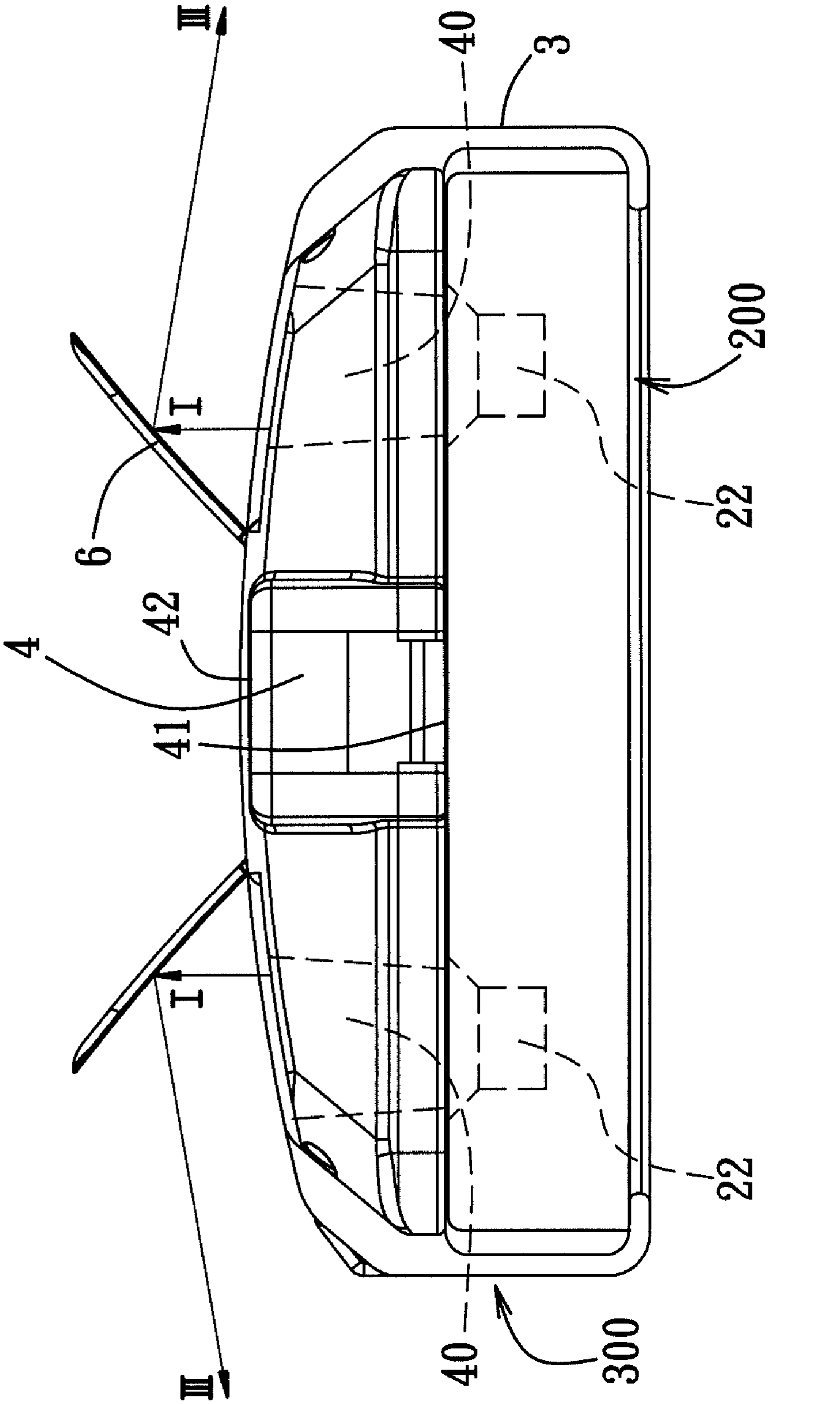
FIG. 8 is a schematic top view showing the preferred embodiment when in another state of use.
Figure 9:
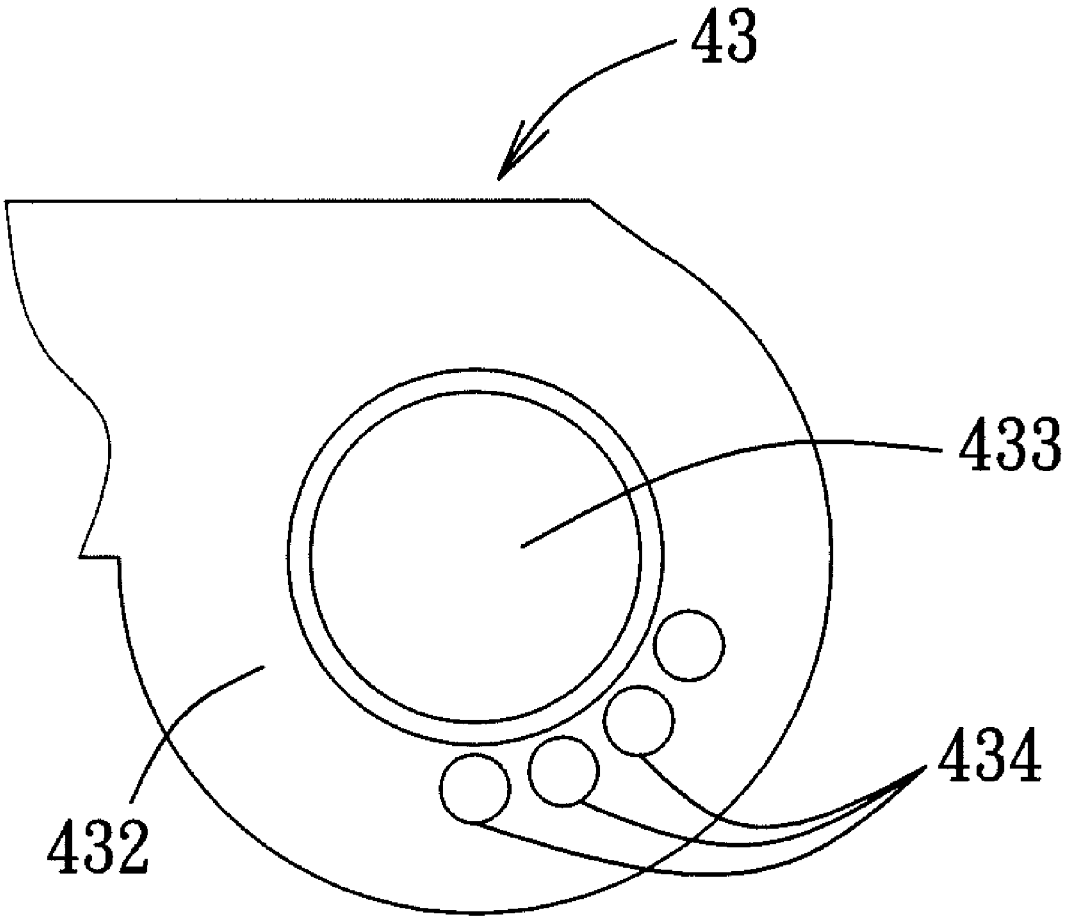
FIG. 9 is a fragmentary schematic bottom view showing a pivot seat of the preferred embodiment.

As shown in FIGS. 5, 6 and 9, each positioning unit has two positioning hole units and two protrusions 64. For each positioning unit, each positioning hole unit includes a plurality of positioning holes 434 that are formed in a corresponding one of the horizontal inner surfaces 432 of a corresponding pair of the pivot seats 43 of the rear wall 4 and that are arranged spacedly around the pivot hole 433, as best shown in FIG. 9. Each protrusion 64 is formed on a corresponding one of the top and bottom surfaces 611, 612 of the pivot block 61 of a corresponding one of the reflecting plates 6 and engages releasably a desired one of the positioning holes 434 of a respective one of the positioning hole units so as to maintain the desired angle between the corresponding one of the reflecting plates 6 and the rear surface 42 of the rear wall 4, thereby positioning the corresponding one of the reflecting plate 6 at the used position. The reflecting plates 6 can also be positioned at another used position, as shown in FIG. 8. It is noted that the reflecting plates 6 can be operated and positioned at a non-used position, where the reflecting plates 6 abut against the rear surface 42 of the rear wall 4.

In sum, due to the presence of the reflecting plates 6, the sound waves of the audio output from the loudspeakers 22 can be guided frontwardly. Furthermore, due to the presence of the through holes 40 in the rear wall 4, the sound waves of the audio output from the loudspeakers 22 can be collected toward the reflecting plates 6 through the through holes 40 in the rear wall 4. Therefore, it is possible for a listener located in front of the electronic device 200 to achieve an improved sound effect.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An auxiliary mounting device for an electronic device, the electronic device including a housing formed with a rear opening unit, and a loudspeaker disposed in the housing for reproducing an audio output in the form of sound waves that propagate rearwardly through the rear opening unit, said auxiliary mounting device comprising:

a mounting seat adapted to be mounted with the electronic device thereon and including an upright rear wall that has opposite front and rear surfaces, and a through hole extending from said front surface to said rear surface and adapted to be aligned with the rear opening unit in the housing of the electronic device when the electronic device is mounted on said mounting seat; and an upright reflecting plate connected to said rear surface of said rear wall, disposed adjacent to said through hole, and pivotable about a vertical axis relative to said rear wall of said mounting seat, said reflecting plate being operated at a used position, where a desired angle is formed between said reflecting plate and said rear surface of said rear wall such that the sound waves propagate rearwardly from the loudspeaker of the electronic device through said through hole in said rear wall of said mounting seat and are then reflected by said reflecting plate so as to propagate sidewardly and frontwardly.

2. The auxiliary mounting device as claimed in claim 1, wherein said through hole in said rear wall of said mounting seat has a diameter increasing gradually from said front surface toward said rear surface.

3. The auxiliary mounting device as claimed in claim 1, wherein:

said mounting seat further has a pair of pivot seats extending from said rear surface of said rear wall and arranged spacedly along the vertical axis, said pivot seats having horizontal inner surfaces that confront each other; and said reflecting plate has a connecting side formed with a pivot block that is disposed between said pivot seats and that has top and bottom surfaces facing respectively said horizontal inner surfaces of said pivot seats;

said auxiliary mounting device further comprising a pivot unit that has two pivot holes each formed in one of a corresponding one of said horizontal inner surfaces of said pivot seats and a corresponding one of said top and bottom surfaces of said pivot block of said reflecting plate, and two pivot rods each formed on the other one of the corresponding one of said horizontal inner surfaces of said pivot seats and the corresponding one of said top and bottom surfaces of said pivot block of said reflecting plate and engaging pivotally a respective one of said pivot holes.

4. The auxiliary mounting device as claimed in claim 3, further comprising a positioning unit that has two positioning hole units each formed in said one of the corresponding one of said horizontal inner surfaces of said pivot seats of said rear wall and the corresponding one of said top and bottom surfaces of said pivot block of said reflecting plate, and including a plurality of positioning holes that are formed in said one of the corresponding one of said horizontal inner surfaces of said pivot seats of said rear wall and the corresponding one of said top and bottom surfaces of said pivot block of said reflecting plate and that are arranged spacedly around said pivot hole, and two protrusions each formed on the other one of the corresponding one of said horizontal inner surfaces of said pivot seats and the corresponding one of said top and bottom surfaces of said pivot block of said reflecting plate and engaging releasably a desired one of said positioning holes of a respective one of said positioning hole units so as to maintain the desired angle between said reflecting plate and said rear surface of said rear wall, thereby positioning said reflecting plate at the used position.

5. An electronic device assembly comprising:

an electronic device including a housing formed with a rear opening unit, and a loudspeaker disposed in said housing for reproducing an audio output in the form of sound waves that propagate rearwardly through said rear opening unit; and an auxiliary mounting device including a mounting seat mounted with said electronic device thereon and including an upright rear wall that has opposite front and rear surfaces, and a through hole extending from said front surface to said rear surface and aligned with said rear opening unit in said housing of said electronic device, and an upright reflecting plate connected to said rear surface of said rear wall, disposed adjacent to said through hole, and pivotable about a vertical axis relative to said rear wall of said mounting seat, said reflecting plate being operated at a used position, where a desired angle is formed between said reflecting plate and said rear surface of said rear wall such that the sound waves propagate rearwardly from said loudspeaker of said electronic device through said through hole in said rear wall of said mounting seat and are then reflected by said reflecting plate so as to propagate sidewardly and frontwardly.

6. The electronic device assembly as claimed in claim 5, wherein said through hole in said rear wall of said mounting seat has a diameter increasing gradually from said front surface toward said rear surface.

7. The electronic device assembly as claimed in claim 5, wherein:

said mounting seat further has two pivot seats extending from said rear surface of said rear wall and arranged spacedly along the vertical axis, said pivot seats having horizontal inner surfaces that confront each other;

said reflecting plate has a connecting side formed with a pivot block that is disposed between said pivot seats and that has top and bottom surfaces facing respectively said horizontal inner surfaces of said pivot seats; and said auxiliary mounting device further includes a pivot unit that has two pivot holes each formed in one of a corresponding one of said horizontal inner surfaces of said pivot seats and a corresponding one of said top and bottom surfaces of said pivot block of said reflecting plate, and two pivot rods each formed on the other one of the corresponding one of said horizontal inner surfaces of said pivot seats and the corresponding one of said top and bottom surfaces of said pivot block of said reflecting plate and engaging pivotally a respective one of said pivot holes.

8. The electronic device assembly as claimed in claim 7, wherein said auxiliary mounting device further includes a positioning unit that has two positioning hole units each including a plurality of positioning holes that are formed in said one of the corresponding one of said horizontal inner surfaces of said pivot seats of said rear wall and the corresponding one of said top and bottom surfaces of said pivot block of said reflecting plate and that are arranged spacedly around said pivot hole, and two protrusions each formed on the other one of the corresponding one of said horizontal inner surfaces of said pivot seats and the corresponding one of said top and bottom surfaces of said pivot block of said reflecting plate and engaging releasably a desired one of said positioning holes of a respective one of said positioning hole units so as to maintain the desired angle between said reflecting plate and said rear surface of said rear wall, thereby positioning said reflecting plate at the used position.

9. An auxiliary mounting device for an electronic device, the electronic device including a housing formed with a rear opening unit, and a loudspeaker disposed in the housing for reproducing an audio output in the form of sound waves that propagate rearwardly through the rear opening unit, said auxiliary mounting device comprising:

a mounting seat adapted to be mounted with the electronic device thereon and including an upright rear wall that has opposite front and rear surfaces, and a through hole extending from said front surface to said rear surface and adapted to be aligned with the rear opening unit in the housing of the electronic device when the electronic device is mounted on said mounting seat;

wherein said through hole in said rear wall of said mounting seat has a diameter increasing gradually from said front surface toward said rear surface such that the sound waves are collected through said through hole to propagate rearwardly.

* * * * *